(12) United States Patent
Ohkawara et al.

(10) Patent No.: US 6,293,165 B1
(45) Date of Patent: Sep. 25, 2001

(54) STRUCTURE FOR SUPPORTING A ROTATING MEMBER ON A SHAFT

(75) Inventors: Masamitsu Ohkawara; Yusuke Akama; Yuji Ikedo; Toshio Watanabe, all of Saitama (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/222,994

(22) Filed: Dec. 30, 1998

(30) Foreign Application Priority Data

Jan. 8, 1998 (JP) .................................................. 10-013203

(51) Int. Cl.⁷ ...................................................... F16H 1/12
(52) U.S. Cl. ........................................ 74/421 R; 74/606 R
(58) Field of Search .............................. 74/421 R, 606 R; 403/326, 327, 220, 221, 222, 223, 224; 369/178; 446/103, 95

(56) References Cited

U.S. PATENT DOCUMENTS

| | | | | |
|---|---|---|---|---|
| 1,751,228 | * | 3/1930 | Bethel | 74/421 R X |
| 1,997,021 | * | 4/1935 | Spase | 74/606 R X |
| 2,019,198 | * | 10/1935 | Spase | 74/421 R X |
| 2,834,620 | * | 5/1958 | Maude | 74/421 R X |
| 4,206,617 | * | 6/1980 | Nakamoto | 64/13 |
| 5,690,656 | * | 11/1997 | Friedman et al. | 446/103 X |
| 5,759,081 | * | 6/1998 | Lyman | 446/103 X |
| 5,862,024 | * | 1/1999 | Watanabe | 369/178 X |

\* cited by examiner

Primary Examiner—Lenard A. Footland
Assistant Examiner—Colby Hansen
(74) Attorney, Agent, or Firm—Arent Fox Kintner Plotkin & Kahn, PLLC

(57) ABSTRACT

A structure for supporting a rotating body has a cylindrical rotating member having a flange perpendicular to an axis and a cylindrical portion, and a fixed shaft for rotatably supporting the rotating member. The flange has a hole, and the shaft has at least one hook projecting from the hole for restricting an axial movement of the rotating member.

6 Claims, 9 Drawing Sheets

STRUCTURE FOR SUPPORTING A ROTATING MEMBER ON A SHAFT

BACKGROUND OF THE INVENTION

The present invention relates to a structure for rotatably supporting a rotating member such as a gear and a pulley for transmitting a driving force to a driven member, on a fixed shaft on which the member rotates.

FIGS. 10a to 10d are sectional views showing various conventional structures for mounting a gear or a pulley on a fixed shaft on a chassis.

Referring to FIG. 10a, a chassis 52 made of resin or metal has a metal shaft 53 securely embedded therein, and a gear 51 is rotatably mounted on the shaft 53. A washer 54 is attached to the shaft 53 so that the gear 51 is prevented from moving upward in the axial direction of the shaft. Hence the gear 51 can be rotated without falling off from the shaft 53.

Referring to FIG. 10b, in another structure, a base 62 made of resin and having an integral shaft 63 is formed on a metal chassis (not shown) by outsert molding. A gear 61 is rotatably mounted on the shaft 63. The shaft 63 has a throughhole 64 at the center thereof, in which a screw 65 is engaged. Thus, the gear 61 is held by a head 651 of the screw 65 so as to be prevented from moving upward in the axial direction of the shaft. The gear 61 can be rotated without coming off from the shaft 63.

As shown in FIG. 10c, a base 72 of resin is formed on a metal chassis (not shown) by outsert molding. A shaft 73 having a hook 74 at the upper end thereof is integrally formed on the base 72, and a gear 71 is rotatably mounted on the shaft 73. The hook 74 prevents the gear 71 from moving upward in the axial direction of the shaft 73, thereby enabling the gear 71 to rotate without coming out of the shaft 73.

In a structure shown in FIG. 10d, a base 82 made of resin formed on a metal chassis (not shown) by outsert molding is provided with an upwardly extending integral shaft 86 in which a hole 83 is formed. A gear 81 made of resin and having a downwardly extending integral shaft 84 is inserted in the shaft 86 so as to be rotated therein. A hook 85 integral with the shaft 84 is provided at the lower end thereof, so that when the gear 81 is mounted, the hook 85 projects out of the hole 83 and engages with the bottom of the base 82, thereby holding the shaft in the hole 83. Thus the gear 81 is prevented from falling off from the base 82 at rotation.

Referring to FIG. 10e, on a metal chassis 92, a base 93 is formed by outsert molding. The base 93 has an integral shaft 94, the upper end of which is formed into a projection 941. A gear 91 is rotatably mounted on the shaft 94. A holder 95 is further formed on the chassis 92 by outsert molding adjacent the base 93. The holder 95 abuts on the projection 941 of the shaft 94 so that the movement of the gear 91 in the axial direction of the shaft is restricted, thereby enabling to rotate the gear 91 without the gear falling off from the shaft 94.

The structure shown in FIG. 10a requires a large number of parts. Moreover, operations for securely attaching the shaft 53 to the chassis 52 and for mounting the washer 54 on the shaft 53 are necessary, so that the manufacturing process cannot be reduced, thereby increasing the manufacturing cost.

In the case of the structure of FIG. 10b, a long time is consumed to attach the screw 65 in the throughhole 64 of the shaft 63. Thus the structure is not suitable for mass production. In addition, when the screw 65 is fastened with excessive force, the shaft 63 may be broken.

In the structure shown in FIGS. 10c and 10d, in order to form the hook 74 or 85 with resin, the structure of the mold for producing the base becomes complicated. If the mold comprises a plurality of parts, the assembled mold causes differences in levels of the surfaces of the base. Hence the rotation of the gear is impaired.

The structure of FIG. 10e involves a large number of parts and a complicated assembling operation so that the manufacturing cost is increased.

SUMMARY OF THE INVENTION

An object of the present invention is to provide a structure for rotatably mounting a rotating member on a shaft where the number of the parts is small, the mounting and the assembling operation are simplified, and the manufacturing cost is significantly decreased.

According to the present invention, there is provided a structure for supporting a rotating body having a cylindrical rotating member having a flange perpendicular to an axis and a cylindrical portion, and a fixed shaft for rotatably supporting the rotating member wherein the flange has a hole, and the shaft has at least one hook projecting from the hole for restricting an axial movement of the rotating member.

The diameter of the hole is smaller than a diameter of a circumscribed circle of the hook.

The flange has at least one opening so as to form a flexible portion in the flange which is retracted by the hook for enabling the hook to pass through the hole.

These and other objects and features of the present invention will become more apparent from the following detailed description with reference to the accompanying drawings.

BRIEF DESCRIPTION OF DRAWINGS

FIG. 4a is a plan view of the rotating member;

FIG. 4b is a sectional view of the rotating member taken along a line IV—IV of FIG. 4a;

DETAILED DESCRIPTION OF THE PREFERRED EMBODIMENT

Figure 1:
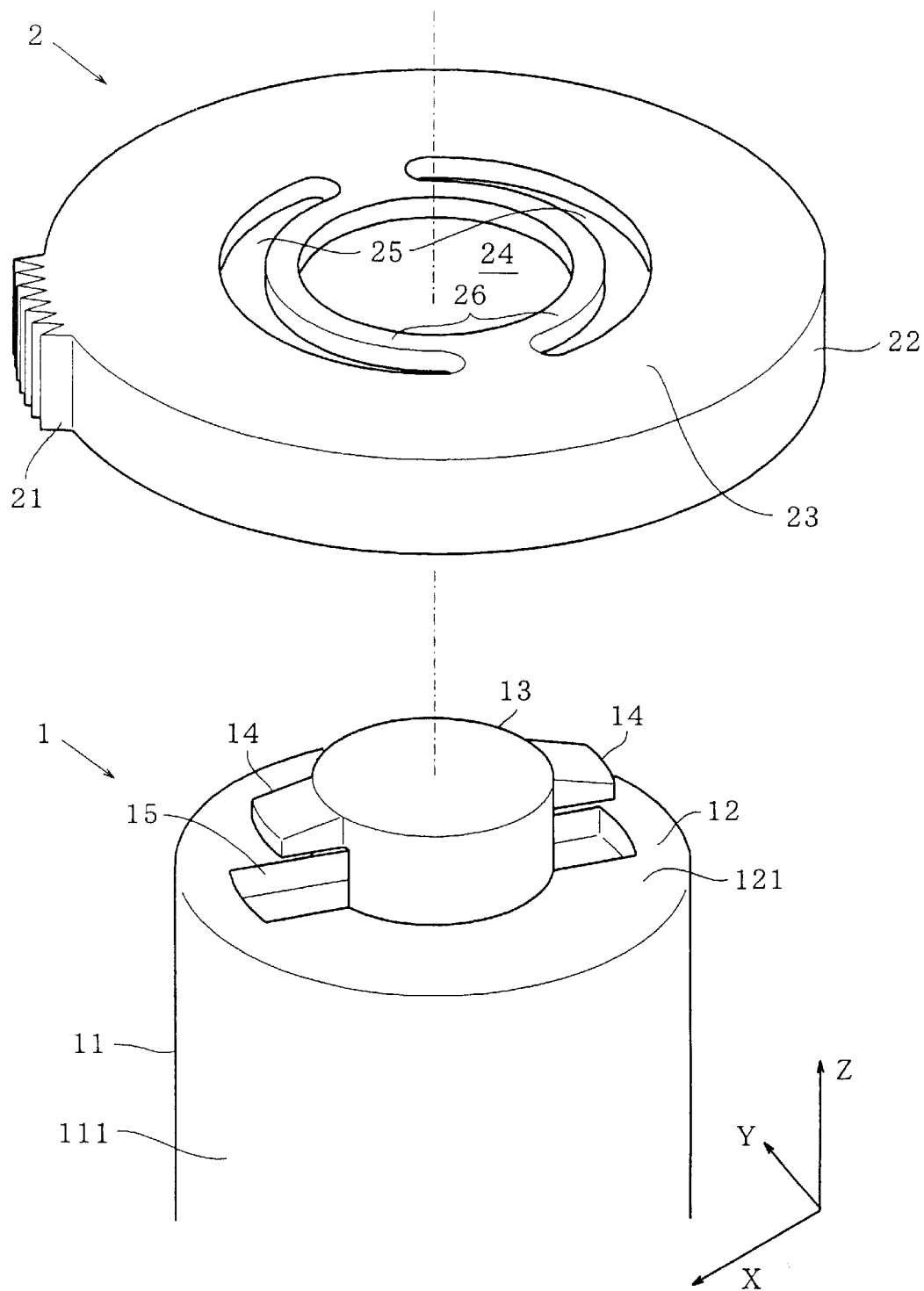
FIG. 1 is an exploded perspective view showing a structure for mounting a rotating member on a shaft in accordance with the present invention.
Figure 2:
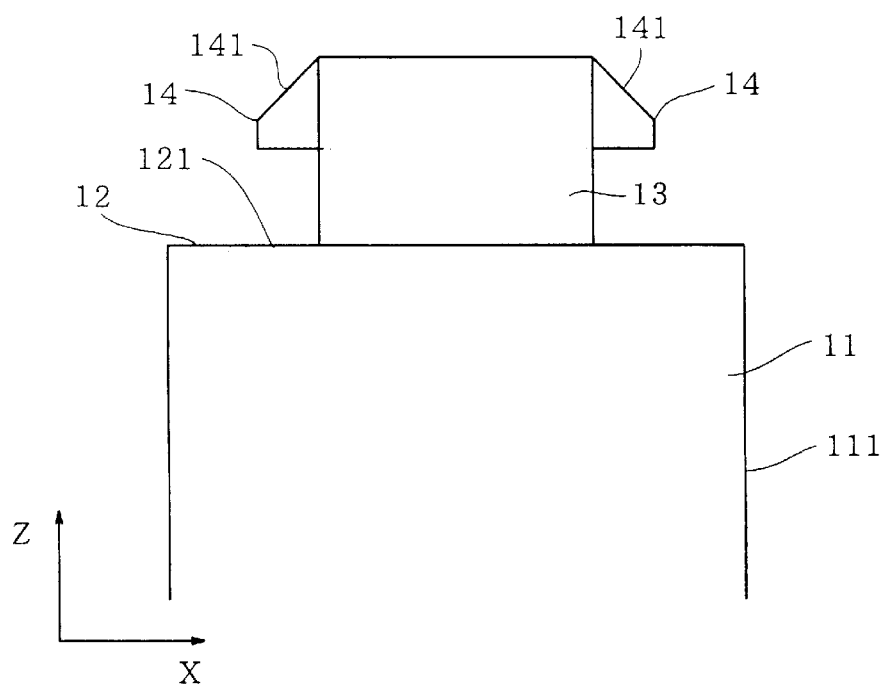
FIGS. 2a and 2b are front and side elevational views of the shaft, respectively.
Figure 2:
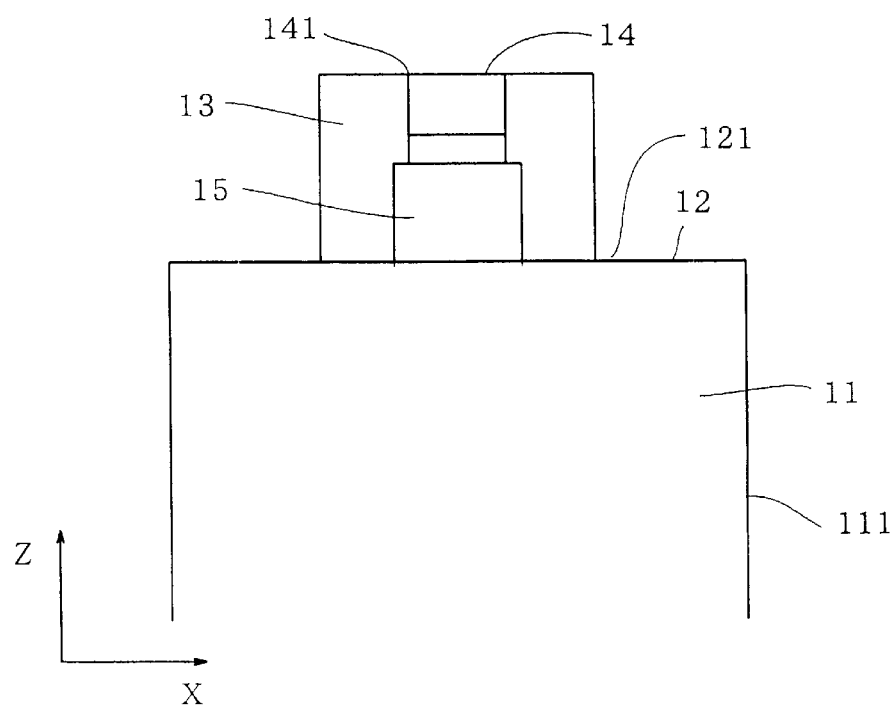
Figure 3:
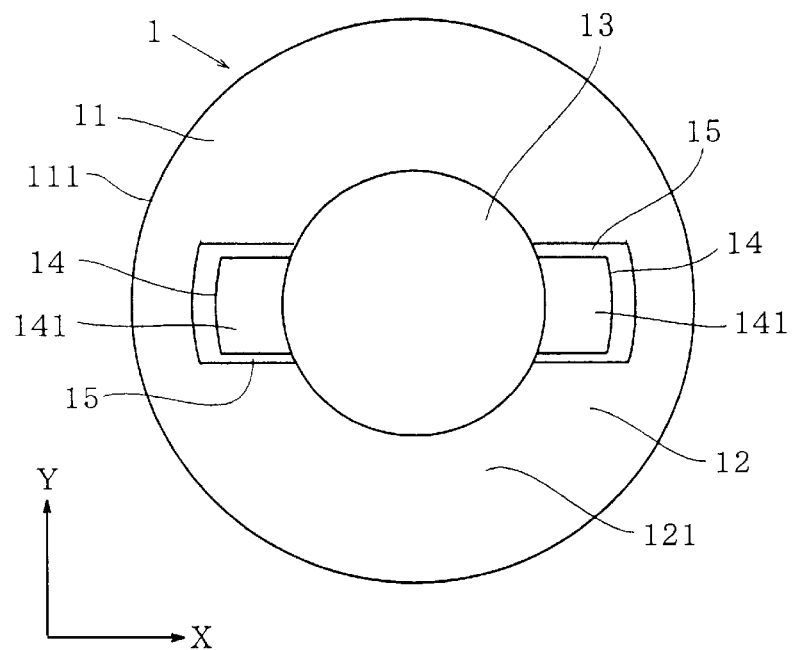
FIGS. 3a and 3b are plan views of the shaft as viewed from above and from the underside, respectively.
Figure 3:
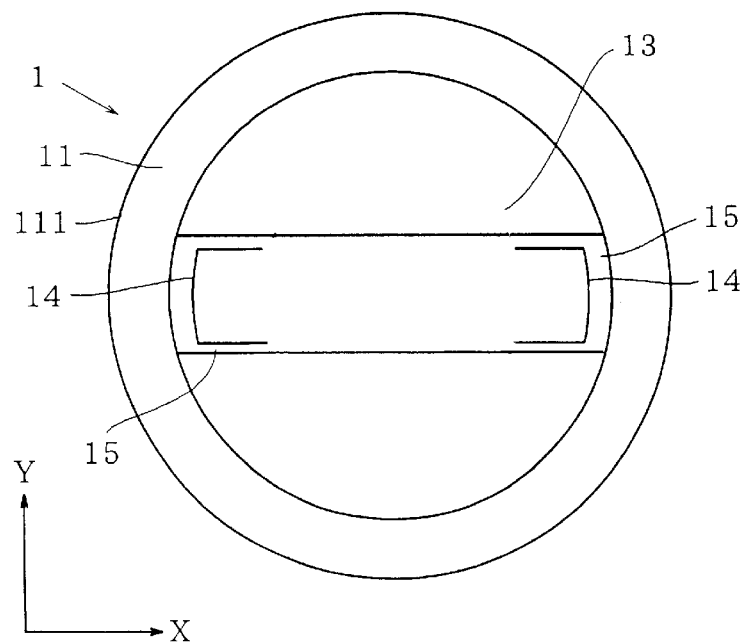

An embodiment of the present invention shown in FIG. 1 relates to a structure for mounting on a fixed shaft 1, a gear 2 for transmitting a driving force generated by a power source comprising a motor, to a driven member. The shaft 1 made of resin is directly formed on a metal chassis (not shown) by such a method as the outsert molding. The shaft 1 may alternatively be separately formed with a metal mold and then embedded in the chassis.

The shaft 1 comprises a first cylindrical portion 11, and a second cylindrical portion 13 coaxially projecting from the first cylindrical portion 11 in the z-axis direction in the figure, and having a smaller diameter than the first cylindrical portion 11. An outer periphery 111 of the first cylindrical portion 11 is adapted to contact an inner wall of the gear 2, so that the gear 2 slips on the periphery 111 as described hereinafter. The first cylindrical portion 11 further has an upper surface 12 including an abutting surface 121 disposed in parallel to the upper surface of the gear 2, namely, disposed in the x-y plane, and carries the gear 2 thereon.

A pair of radially extending opposite hooks 14 are formed on the periphery of the second cylindrical portion 13. The hooks 14 are provided for restricting the axial movement of the gear 2 when mounted on the shaft 1. An aperture 15 is inevitably formed in the upper surface 12 of the first cylindrical portion 11 under the hooks 14 when the shaft 1 is manufactured by the method which will be described later in detail.

Referring to FIGS. 2a, 2b, 3a and 3b, the hooks 14 of the second cylindrical portion 13 extend substantially perpendicularly to the axial direction (z-axis direction) of the second cylindrical portion 13, namely in the x-axis direction in the figures. The underside of each hook 14 is a flat surface formed in parallel to the bottom surface of the gear 2 in the x-y plane. On the other hand, the upper portion of each of the hooks 14 is slanted to form an inclination 141 which is downwardly slanted towards the outer portion of the hook.

Figure 4:
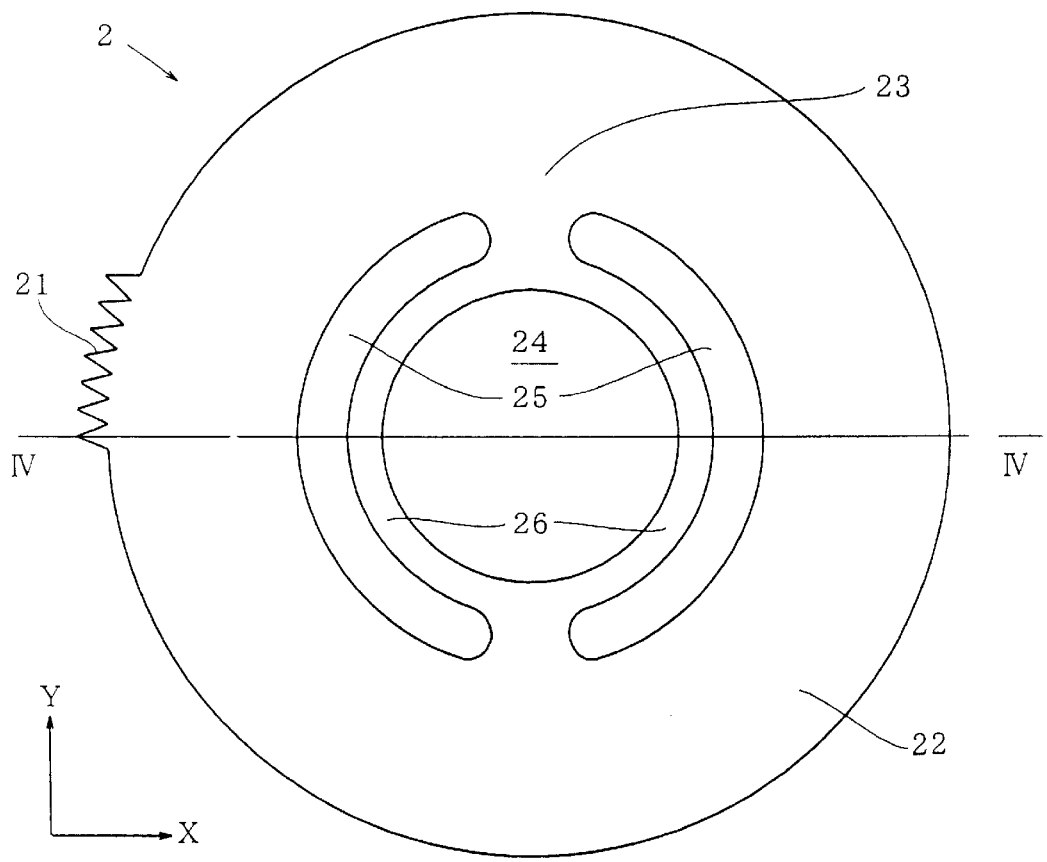
Figure 4:
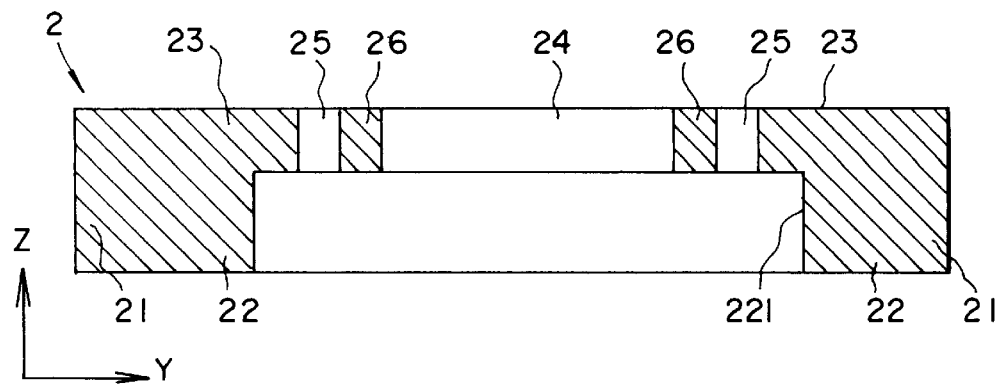

Referring to FIGS. 4a and 4b, the gear 2 having teeth 21 on the outer periphery thereof, is made of resin. The gear comprises a cylindrical portion 22 having a cylindrical recess 221, and an annular flange 23 projecting inwardly from the upper portion of the cylindrical portion 22, thereby defining a substantially circular center hole 24. The diameter of the hole 24 is slightly larger than the diameter of the second cylindrical portion 13 of the shaft 1 and smaller than the distance between the outer peripheral ends of the hooks 14.

A pair of opposite arcuated elongated openings 25 are formed about the hole 24, penetrating the flange 23. Consequently, a pair of annular flexible portions 26 are formed between the hole 24 and the openings 25.

The operation for mounting the gear 2 on the shaft 1 will be described hereinafter with reference to FIGS. 5a to 5d.

Figure 5:
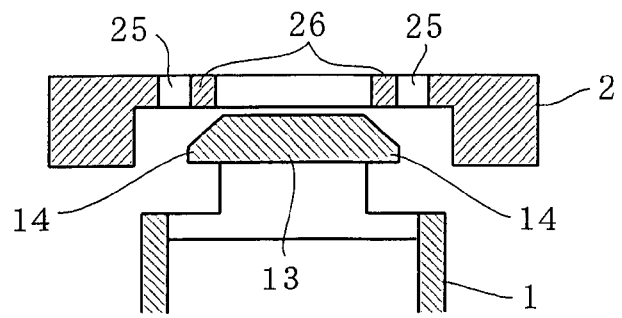
FIGS. 5a to 5d are sectional views explaining the operation for mounting the rotating member on the shaft.
Figure 5:
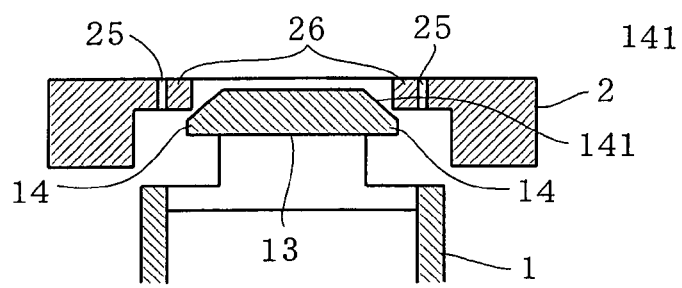
Figure 5:
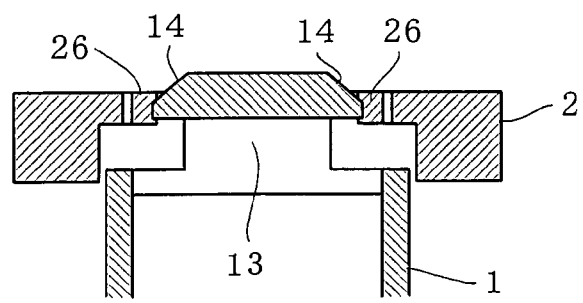
Figure 5:
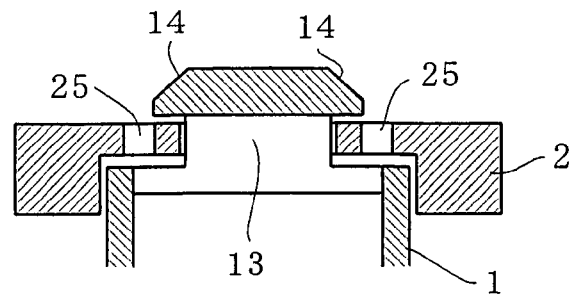

Referring to FIG. 5a, the gear 2 is held above the shaft 1 so that the second cylindrical portion 13 confronts the center hole 24 of the gear 2. The gear 2 is pushed against the shaft 1, thereby rendering the second cylindrical portion 13 to enter the center hole 24 as shown in FIG. 5c. At that time, each hook 14 of the shaft 1 abuts on the lower inner edge of the flexible portion 26. As the gear 2 is further pushed against the shaft, the lower inner edge slides along the inclination 141 of the recess 14, thereby gradually yielding the flexible portion 26 to be urged into the arcuated opening 25. Thus, the center hole 24 of the gear 2 is expanded.

When the distance between the opposing flexible portions 26 becomes sufficiently large to correspond to the distance between the ends of the hooks 14 as shown in FIG. 5c, the hooks 14 passes through the hole 24. As a result, the gear 2 is completely engaged with the shaft 1. Meanwhile, due to the restoring force, the flexible portions 26 return toward the periphery of the second cylindrical portion 13 and engaged in the space between the hook 14 and the upper surface 12 of the first cylindrical portion 11. Due to the inclination 141, the gear 2 can be smoothly engaged with the shaft 1.

The gear 2 is held by the underside of each hook 14 so as to be prevented from moving in a direction opposite to the engaging direction, namely a direction perpendicular to the rotating surface of the gear 2. When the gear 2 and the shaft 1 are thus assembled, the underside of the flange 23 rests on the abutting surface 121 of the upper surface 12 of the first cylindrical portion 11.

When the gear 2 is rotated, the inner periphery of the recess 221 of the gear 2 slips on the outer periphery 111 of the shaft 1, and the underside of the flange 23 slips on the abutting surface 121. The underside of each hook 14 abuts on the flange 23. Hence, the hooks 14, in cooperation with the abutting surface 121, prevents the upper surface of the gear 2 from vibrating at the rotation.

Figure 6:
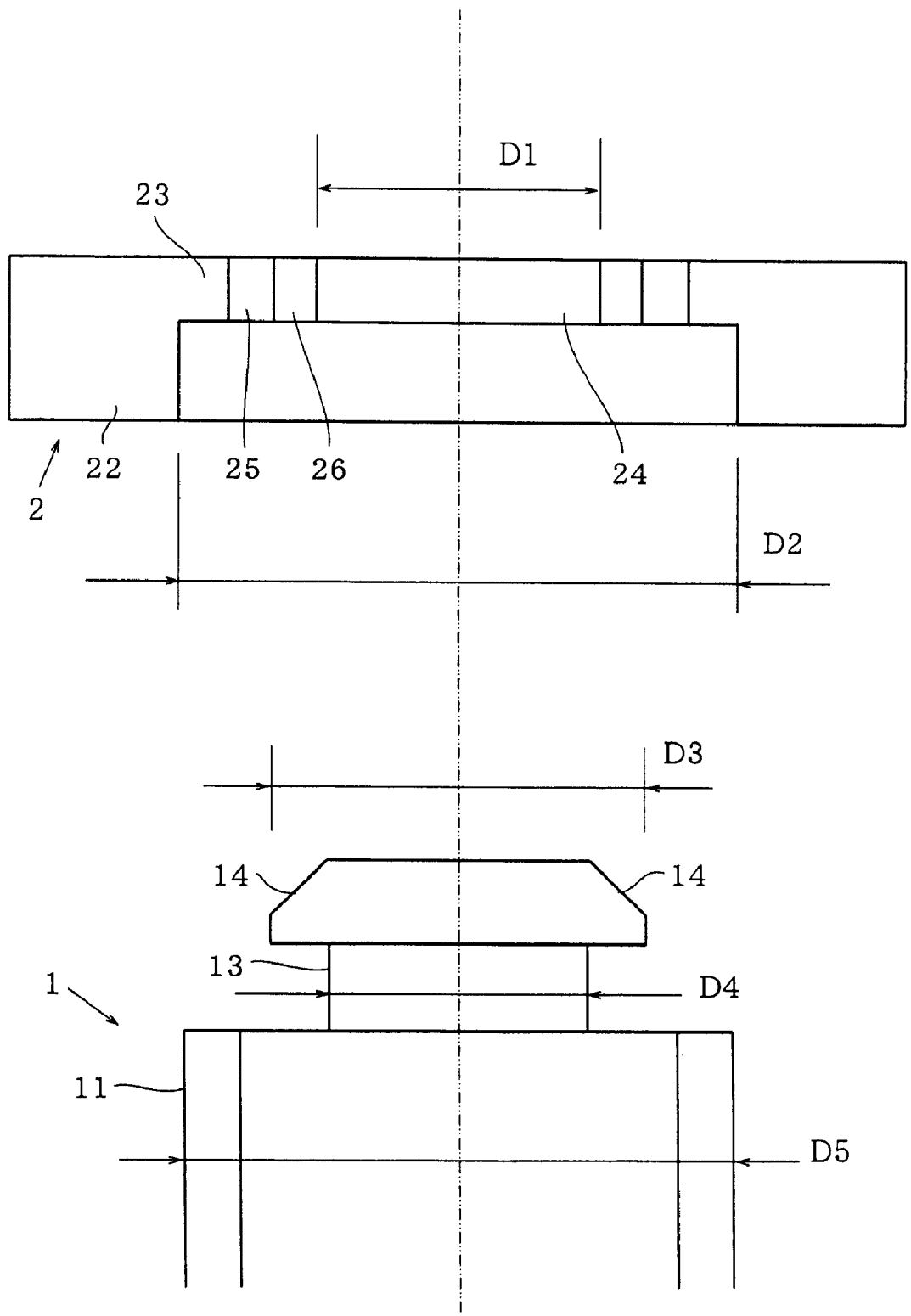
FIG. 6 is an illustration explaining the relationship among dimensions of the rotating member and the shaft.
Figure 7:
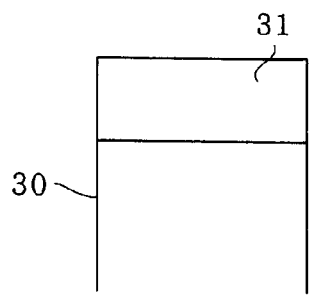
FIGS. 7a and 7b are front and side elevational views of a core for producing the shaft, respectively.
FIGS. 7c and 7d are plan views of the core as viewed from the underside and from above, respectively.
FIGS. 7e and 7f are front and side elevational views of a mold for producing the shaft, respectively.
FIGS. 7g and 7h are plan views of the mold as viewed from the underside and from above, respectively.
Figure 7:
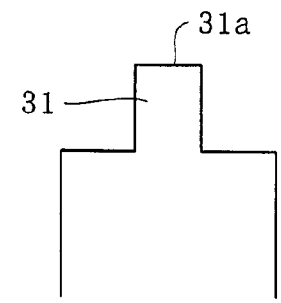
Figure 7:
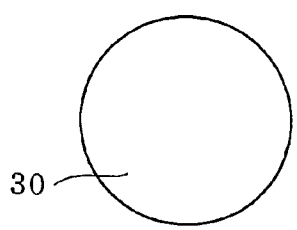
Figure 7:
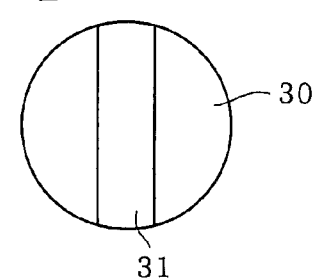
Figure 7:
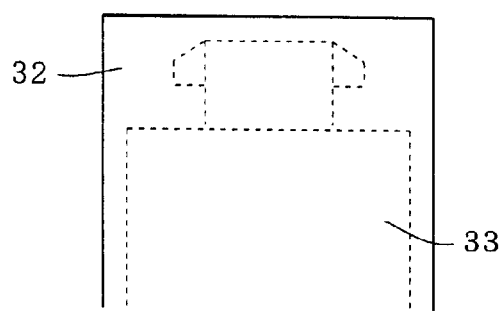
Figure 7:
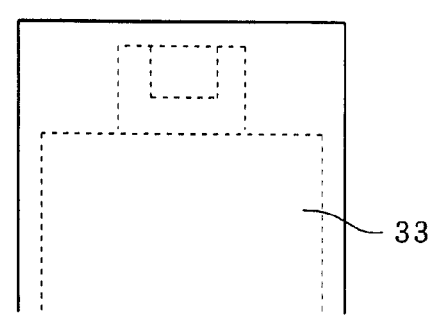
Figure 7:
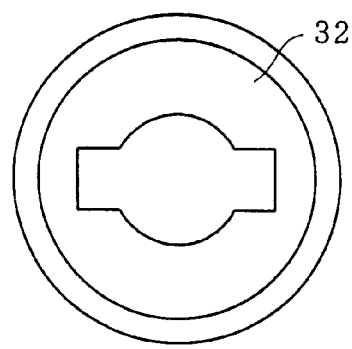
Figure 7:
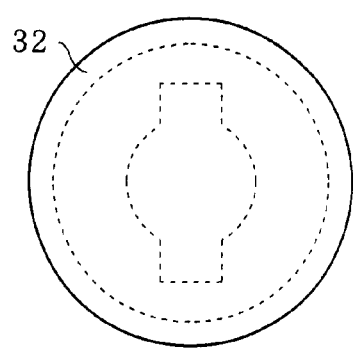

The dimensions of the shaft 1 and the gear 2 will be described in detail with reference to FIG. 6.

A diameter D1 of the hole 24 in the flange 23 of the gear 2 is slightly larger than a diameter D4 of the second cylindrical portion 13 and smaller than a diameter D3 of the circumscribed circle of the hooks 14 in a normal circumstance shown in FIGS. 5a and 5d. However, the diameter D1 changes as the flexible portions 26 yield. Namely, when the yielding quantity becomes maximum as shown in FIG. 5c, the diameter D1 is larger than the distance D4.

In addition, the diameter D1 of the hole 24 is smaller than a diameter D5 of the first cylindrical portion 11, and an inner diameter D2 of the cylindrical portion 22 is slightly larger than the diameter D5. Namely, when the relationship between the diameters is D2>D5>D1. the flange 23 can be rotatably mounted on the upper surface 12 of the shaft 1.

The diameter D5 of the first cylindrical portion 11 is larger than the diameter D3 and the diameter D4. When D5>D3>D4, the shaft 1 can be easily manufactured in accordance with the method described hereinafter.

The shaft 1 of the present embodiment is produced with a mold 32 and a core 30 inserted in the mold 32, which are shown in FIGS. 7a to 7h. When the mold 32 and the core 30 are accurately positioned with respect to each other, resin is injected in a space therebetween, thereby forming the shaft 1.

Referring to FIGS. 7a to 7d, showing the front and side elevational views and plan views as viewed from the underside and from above, respectively, the core 30 has an elongated projection 31 along the diameter thereof at an upper portion. An upper surface 31a of the projection 31 corresponds to the undersides of the hooks 14 of the shaft 1. The aperture 15 shown in FIG. 1 is formed by a part of the projection 31.

Referring to FIGS. 7e to 7h, showing the front and side elevational views and plan views as viewed from the underside and from above, respectively, the mold 32 has an inner space 33 as shown by the dashed lines for outlining the shaft 1.

Figure 8:
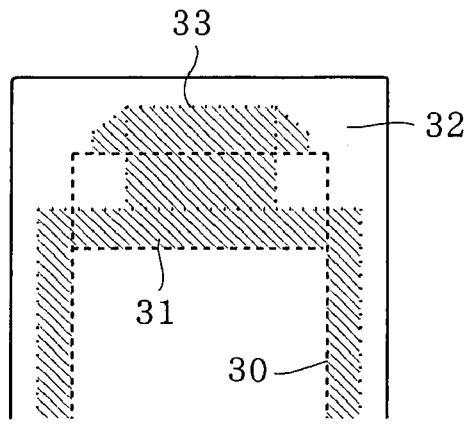
FIGS. 8a and 8b are illustrations showing the assembled core and the mold of FIGS. 7a to 7f.
Figure 8:
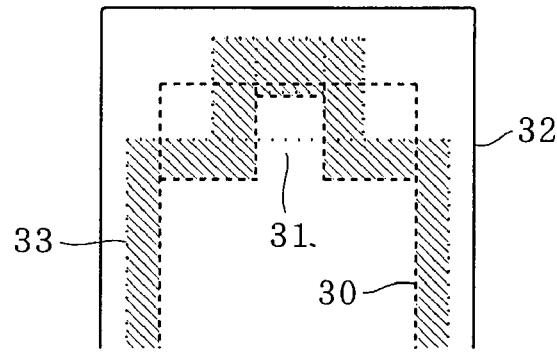

The core 30 is disposed inside the mold 32, providing an appropriate space therebetween as shown in FIGS. 8a and 8b. In the figures, the dotted lines indicate the inner space in the mold 32, that is the outer shape of the shaft 1, and the dashed lines indicate the outer shape of the core 30, that is the inner shape of the shaft 1. Resin is poured into a space shown by the hatched area between the core 30 and the mold 32.

After the resin is hardened, the mold 32 is raised and the core 30 is lowered, namely, pulled in opposite directions from each other, thereby enabling to take out the shaft 1. The mold 32 and the core 30 need simply to be moved linearly in the opposite directions on a single axis to retrieve the shaft 1. Hence the shaft can be produced in a short time, thereby rendering it appropriate for mass production and keeping the manufacturing cost low.

The length of each hook 14 may be modified as appropriate in accordance with the yielding quantities of the flexible portions 26 of the gear 2, as long as the diameter D3 is larger than the diameter D1 of the hole 24 at normal state. For example, if the diameter D3 is only slightly larger than the diameter D1, due to the resilience of the resin comprising the hooks 14, the gear 2 can be mounted on the shaft 1 without the aid of the flexible portions 26.

Figure 9:
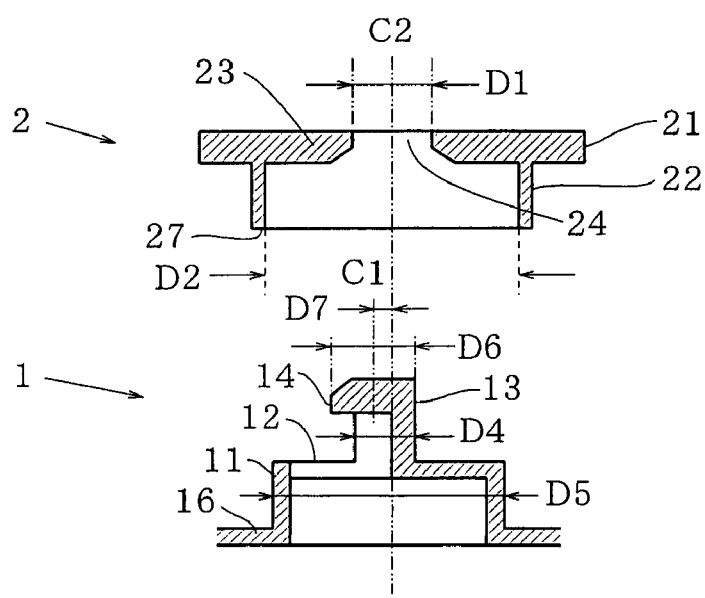
FIG. 9 is a sectional view showing a model structure of a second embodiment of the present invention.
Figure 10:
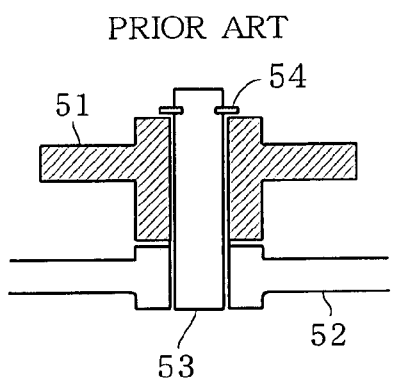
FIGS. 10a to 10e are sectional views showing various conventional structures for mounting the rotating member on the shaft.
Figure 10:
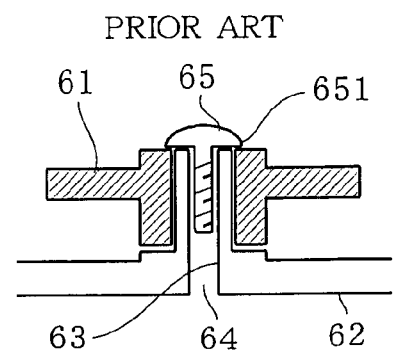
Figure 10:
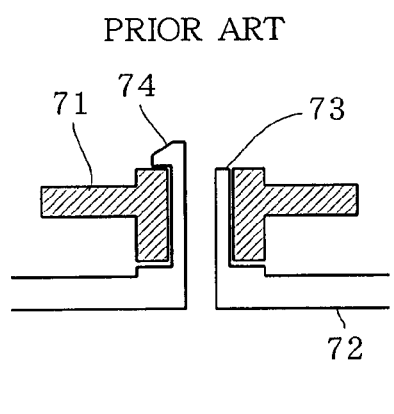
Figure 10:
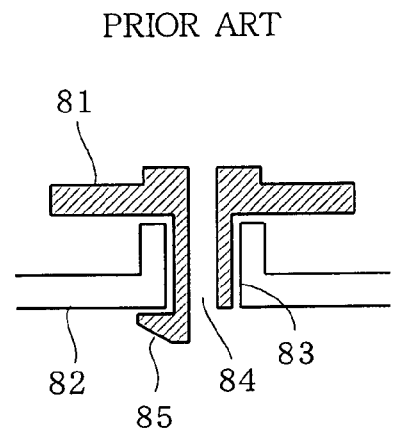
Figure 10:
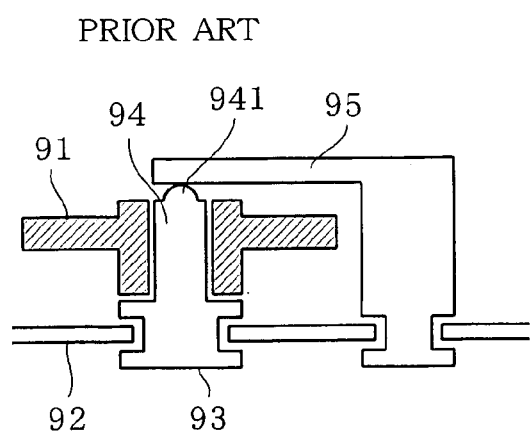

Referring to FIG. 9 showing a second embodiment of the present invention, the openings 25 and the flexible portions 26 of the first embodiment are not provided in the flange 23. The second cylindrical portion 13 is formed on the first cylindrical portion 11 offset from the axis thereof, and furthermore, provided with only one hook 14. A flange 16 is formed on the outer periphery of the shaft 1.

More particularly, a center C1 of a length D6 is offset from a center C2 of the diameter D5 of the first cylindrical portion 11, which coincides with the center of the diameter D1 of the hole 24 formed in the gear 2, by an offset D7.

With regard to the relationship between the shaft and the gear, the diameter D1 of the hole 24 of the gear 2 is substantially equal to or larger than the length D6. Furthermore, the diameter D1 is smaller than the diameter D5 of the first cylindrical portion 11, and the inner diameter D2 of the gear 2 is slightly larger than the diameter D5. The diameter D5 is larger than the length D6 and the diameter D4 of the second cylindrical portion 13.

Upon assemblage, the gear 2 is so held as to coincide the center C2 thereof with the center C1 of the second cylindrical portion 13 and the hook 14 of the shaft 1. Thus, the hook 14 is allowed to pass through the hole 24 of the gear 2. Thereafter, the gear 2 is moved to the left so that the first cylindrical portion 11 fits in the cylindrical portion 22 of the gear 2 and an end 27 of the cylindrical portion 22 rests on the flange 16 of the shaft 1.

When the gear 2 thus mounted on the shaft 1 is rotated, the flange 16 holds the gear 2. Since the underside of the hook 14 holds the upper surface of the gear 2, the gear 2 is prevented from moving in the axial direction.

The rotating member provided in the structure of the present invention may be a gear having teeth only along a part of the periphery thereof. The rotating member may further be a pulley, in which case, a groove is formed around the outer periphery of the rotating member for disposing a power transmission belt.

From the foregoing it will be understood that the present invention provides a structure for mounting a rotating member on a shaft wherein a hook for restricting the movement of the gear in the axial direction of the shaft is integrally formed on the shaft, so that the number of parts is decreased as much as possible. Moreover, the manufacture of the shaft and the assemblage of the rotating member and the shaft is simplified, thereby significantly reducing the manufacturing cost.

While the invention has been described in conjunction with preferred specific embodiment thereof, it will be understood that this description is intended to illustrate and not limit the scope of the invention, which is defined by the following claims.

What is claimed is:

1. A structure for supporting a rotating body having a cylindrical rotating member having a flange perpendicular to an axis and a cylindrical portion, and a fixed shaft which has a periphery slidable on an inner wall of the cylindrical portion and rotatably supports the rotating member wherein the flange has a hole whose diameter is adjustable; and the shaft has at least one hook projecting from the hole for restricting an axial movement of the rotating member.

2. The structure according to claim 1 wherein a diameter of the hole is smaller than a diameter of a circumscribed circle of the hook.

3. The structure according to claim 2 wherein a part of the flange is flexible to change a shape in accordance with a shape of the hook.

4. The structure according to claim 1 wherein a diameter of a circumscribed circle of the hook is smaller than a diameter of the fixed shaft.

5. The structure according to claim 1 wherein a part of the flange is flexible to change a shape in accordance with a shape of the hook.

6. The structure according to claim 5 wherein interaction between the hook and the hole in the flange proximate the flexible portion causes a temporary enlargement in the size of the hole in the flange while the hook passes through the hole in the flange.

* * * * *

UNITED STATES PATENT AND TRADEMARK OFFICE
CERTIFICATE OF CORRECTION

PATENT NO. : 6,293,165 B1
DATED : September 25, 2001
INVENTOR(S) : Ohkawara et al.

Page 1 of 1

It is certified that error appears in the above-identified patent and that said Letters Patent is hereby corrected as shown below:

<u>Title page,</u>
Item [73] Assignee, change to read -- Pioneer Electric Corporation and Pioneer Precision Machinery Corporation Tokyo (JP) --.

Signed and Sealed this

Twenty-second Day of January, 2002

Attest:

*Attesting Officer*

JAMES E. ROGAN
*Director of the United States Patent and Trademark Office*